July 8, 1941.   R. A. E. HIGONNET ET AL   2,248,758
OPTICAL SYSTEM FOR REDUCING THE VIEWING ANGLE OF CERTAIN
DEVICES SUCH AS PHOTOELECTRIC CELLS
Filed Oct. 15, 1937

INVENTORS
RENE A. E. HIGONNET
ROBERT M. LUCAS
BY
ATTORNEY

Patented July 8, 1941

2,248,758

UNITED STATES PATENT OFFICE 2,248,758

OPTICAL SYSTEM FOR REDUCING THE VIEWING ANGLE OF CERTAIN DEVICES SUCH AS PHOTOELECTRIC CELLS

René Alphonse Eugène Higonnet and Robert Maurice Lucas, Paris, France, assignors to International Standard Electric Corporation, New York, N. Y.

Application October 15, 1937, Serial No. 169,224
In France November 7, 1936

4 Claims. (Cl. 88—23)

This invention relates to devices serving for the utilisation of radiant energy and, more particularly, to those devices which restrict the radiant energy to be used to that contained in a useful limited solid angle.

The invention provides, in accordance with certain of its characteristics, means for preventing the radiant energy, for example light, emitted or reflected by objects placed outside a determined solid angle from affecting the sensitive element or elements of the device.

The invention provides also, in accordance with certain features, means for limiting this solid angle to such a degree that the action of an element sensitive to a radiant energy, such as light, may be rendered directive with a precision as great as desired.

The invention will be explained in more detail in the following description of a certain number of embodiments shown in the attached drawing in which.

Figure 4:
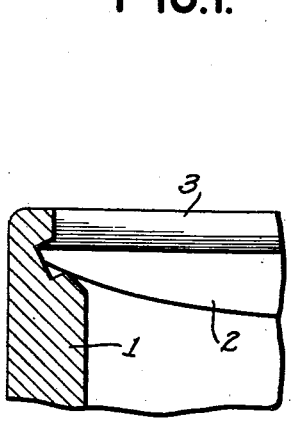
Figure 5:
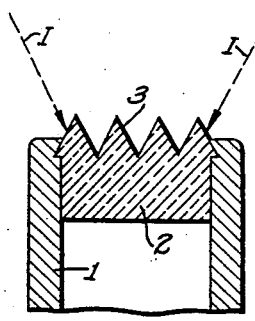
Figure 6:
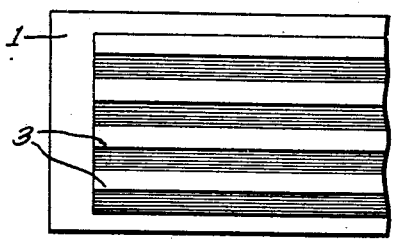
Figure 7:
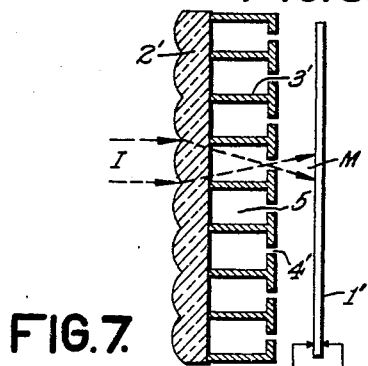

Figures 4, 5 and 6 illustrate another embodiment of such a device; Fig. 4 being a plan section of half the device; Fig. 5 a sectional side elevation of the device and Fig. 6 an end elevation of one-half the device;

Figure 7 shows an embodiment of a device fulfilling the condition of directivity which has been mentioned.

Figure 1:
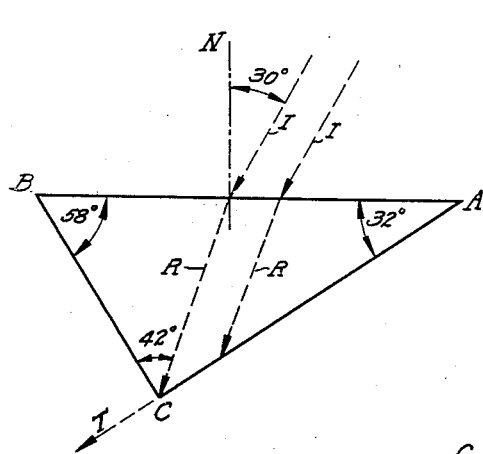
Figures 1 and 2 show schematically two optical systems adapted to be employed in such devices.
Figure 2:
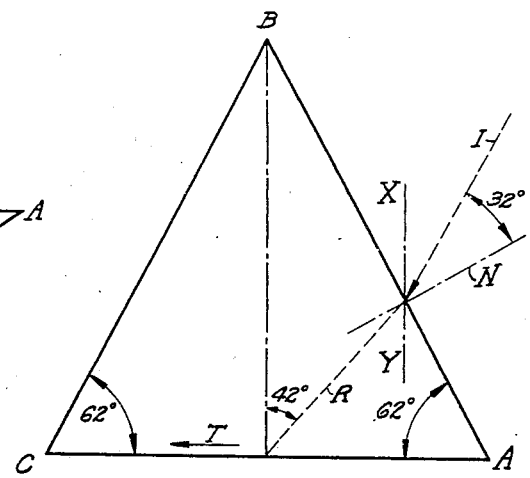

Among the systems of utilisation or measurement of radiant energy, such as light, it is required, in apparatus such as exposure meters in particular, to have a solid useful limited angle for their sensitive element, which in the case under consideration consists of a photoelectric cell in order to limit its useful field angle to the same value as that of a photographic apparatus or in order to avoid the harmful influence of certain parts of the luminous field, such as the sky, contrasting too violently with the mean luminous intensity of the object or of the scene of which it is desired to measure the emitted or reflected energy and not actually forming a part of the subject chosen. The embodiments described in the present specification are particularly adapted to be employed in apparatus of this type. Figs. 1 and 2 show two forms of prisms which may be employed in such exposure meters in order, for example, to avoid the influence of the sky on the cell and to obtain a reduced useful field comparable to that of the photographic apparatus with which they are ordinarily employed.

Referring to Fig. 1, a prism of section ABC of glass or other transparent refractive substance is shown there, as well as the path of a luminous ray forming an angle of 30° with the normal N on the outer surface of the prism, of course supposing that this surface is presented to the radiation of which it is desired to utilise (for example measure) the energy. The path of the luminous ray is shown at I in the air, R in the glass, and the portion T of the latter shows the direction of the limiting emergent ray at the critical angle beyond which there is total reflection of the incidental ray. In this manner the luminous rays arriving on the surface AB with an angle of incidence greater than 30° will not pass and will be reflected. The approximate values for the angles are given in Fig. 1, by way of example, for an index of refraction of the glass 1.5 with respect to the air. The face BC is also shown arbitrarily chosen to be normal to the face AC. It is however, obvious that for other values of index of refraction of the refractive substance employed, the angle BAC, which in this case is equal to 32° would have a different value in order to obtain a total reflection of the ray arriving at an incident angle of, for example, 30° or at any other angle in accordance with the type of use.

Such a prism might be employed as an optical system limiting the solid useful angle, for example, in a photoelectric cell exposure meter, it will be sufficient to arrange it in place of the lens ordinarily employed in such devices, so that the angle BAC has its peak directed towards the upper portion of the exposure-meter in the normal position. It is clear that instead of employing a single prism a series of such prisms might be provided associated in the exposure-meter which, in certain cases, would reduce the space occupied by the optical system. It is also possible to conceive the use of two or more prisms, arranged in front of each other, in such a way that a limitation of the useful angle is obtained in two or more directions. Or two or more sets of prisms may be conveniently enclosed for the same purpose.

In Fig. 2 is shown another prism permitting a total reflection of the rays to be obtained in two directions at once. For example, if it be desired to limit the useful angle to 30° on each side of the axis XY of the apparatus, the adjacent angles at the base AC of the prism ABC have a value of about 62° when 1.5 is taken as value of the index of refraction of the refraction substance employed. The value of the angles indicated on Fig. 2 are calculated for this case.

It is clear that if it be desired also to limit the solid useful angle in the two directions perpendicular to the directions shown, one can no longer employ a prism but a pyramid whose angles at the base of the diagonal plane will have a suitable value, for example, of 62° approximately, for an index of refraction of 1.5.

It is also clear that the angles of the prisms mentioned above may be made different when it is desired to reduce the viewing angle to different values in different directions.

It is also clear that either of the two prisms described as examples may be combined with a lens in order to concentrate the useful rays on a photoelectric cell of reduced dimensions. One can also conceive of giving to the plane surface of these prisms a suitable curvature in order to arrive at the same result with one piece of glass or single refractive substance. According to the particular case, this lens may be associated with the prisms without optical contact in order to facilitate the reflections or form a part thereof, or be in optical contact.

Figure 3:
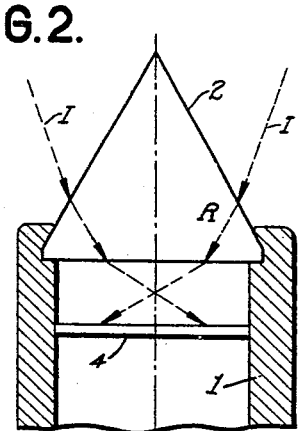
Figure 3 shows a simple embodiment of a device employing the optical system of Fig. 2.

Fig. 3 shows a prism similar to that of Fig. 2 mounted in an exposure-meter of which the casing body is indicated at 1 and the photoelectric cell at 4. Figs. 4, 5 and 6 show an embodiment of a device limiting the solid angle in an exposure-meter, for example, and employing a piece of glass 2 whose front surface is formed in accordance with a row of such prisms 3, mounted in the casing 1 of the apparatus. It is also possible to shape the front surface of such an optical system not in accordance with a row of prisms but in accordance with a mosaic of associated prisms.

The mosaic of prisms may be associated with a plurality of tubes in same numbers, in the form of a honeycomb, to further reduce the viewing angle by preventing unwanted side light rays from falling on the photocell.

A further means of reducing to a very small value the viewing angle is to replace the above mentioned prisms by a plurality of light concentrating devices, or lenses and behind the honeycomb at a distance equal to the focal length of the lenses an opaque screen provided with holes.

Fig. 7 shows an embodiment of such an arrangement. In this drawing a photoelectric cell 1' is placed behind an optical system composed of a piece of glass or other suitable refractive substance 2' with which is associated an opaque screen 3' perforated with holes 4' separated from the lens 2' by a honey-comb portion 5. The glass portion 2' is lenticular on its front surface and the honeycomb portion 5 comprises as many cells as there are elementary lenses in the portion 2', arranged so that a hole 4' in the screen 3' can only pass the light proceeding from the corresponding elementary lens.

The screen 3' being placed in the plane of the focusses of the elementary lenses 2', each luminous bundle I proceeding from a lens will make on this plane an image which includes the image of a desired distant object. The screen 3' is perforated with an aperture 4' corresponding to the surface of this desired image, thus limiting the useful solid angle to that which has as its peak the elementary lens and as its base the surface of the desired object under consideration. The light emitted or reflected by other even very adjacent objects, thus, does not arrive on the sensitive element. The distance between the sensitive element 1' and the screen 3' is determined so that the light passing through the apertures 4' is not impressed on one portion only of the surface of cell 1' in order to avoid too great a density of energy received on these points which might deteriorate the sensitive surface.

Any number of such separate optical elements may be associated so as to increase the sensitivity or the whole set of elementary lenses may be formed of the same piece of glass, for example, by moulding.

In order to reduce the size of photoelectric cells a light concentrating device may be placed behind the screen in order to concentrate the lights passing the holes provided therein on a photocell of smaller size than the screen itself.

Such a light concentrating device may be a spherical lens, placed directly behind the screen or at a distance therefrom. Or in order to further reduce the size it may be used a staggered lens provided for instance with as many rows as are provided rings of holes in the opaque screen, in the case of a device having a circular shape. Each of these annular members deviate light falling on them through the holes provided in the screen and cause it to fall on a small size photocell placed at some distance therefrom.

These elementary refracting members may have spherical or conical surfaces, in this latter case they deviate light as prisms.

Although these devices have been described in the case of light, it is obvious that similar arrangements may be provided in the case of radiation other than light, for example, infrared or ultra-violet radiations; the nature of the sensitive device alone would be modified.

What is claimed is:

1. A device responsive to light incident within a given solid angular region which comprises a transparent refractive body having two faces one of said faces being plane and the other of said faces being cylindrical, the plane of said plane face intersecting at an angle all planes containing the axis of said cylindrical face and light incident upon said plane face within said angular region being refracted and emerging from said cylindrical face, and light incident upon said plane face outside of said given angular region being totally reflected at said cylindrical face, and a photocell disposed to receive the light emerging from said cylindrical face.

2. A device responsive to light incident within a given solid angular region which comprises a transparent refractive body having two faces, one of said faces being formed by a plurality of parallel prisms and the other of said faces being cylindrical, the apexes of said prisms being disposed at right angles to the axis of said cylindrical surface, and light incident upon said prisms being refracted and emerging from said cylindrical face, and light incident upon said prisms outside of said given angular region being totally reflected at said cylindrical face, and a photocell disposed to receive the light emerging from said cylindrical face.

3. A device according to claim 2 further comprising a plurality of tubes between said cylindrical surface and said photocell, arranged in the form of a honeycomb and disposed to obstruct the passage of said undesired light rays to said photocell.

4. A device in accordance with claim 2 wherein said prisms have two faces and said faces are assymmetrically disposed with respect to the total solid angle of arrival of incident light, whereby two different angular limits for said given solid angular region are defined.

RENÉ ALPHONSE EUGÈNE HIGONNET.
ROBERT MAURICE LUCAS.